July 23, 1968      L. BESS      3,393,600

OPTICAL RANGING APPARATUS

Filed Sept. 10, 1965      6 Sheets-Sheet 1

INVENTOR.
Leon Bess
BY
Attorney

INVENTOR.
Leon Bess

July 23, 1968 L. BESS 3,393,600
OPTICAL RANGING APPARATUS
Filed Sept. 10, 1965 6 Sheets-Sheet 3
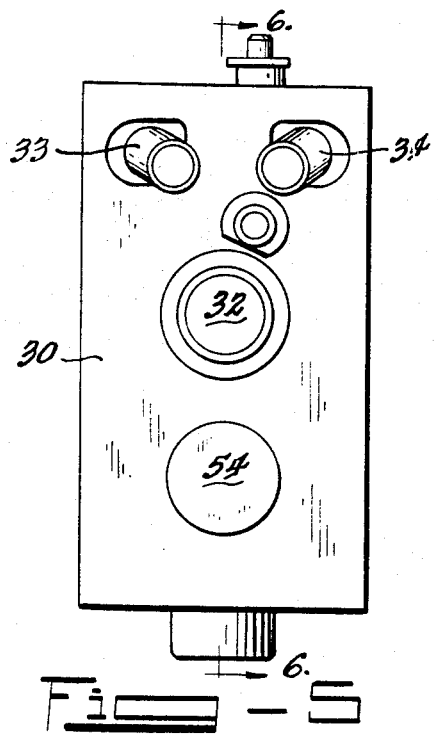
Fig-5
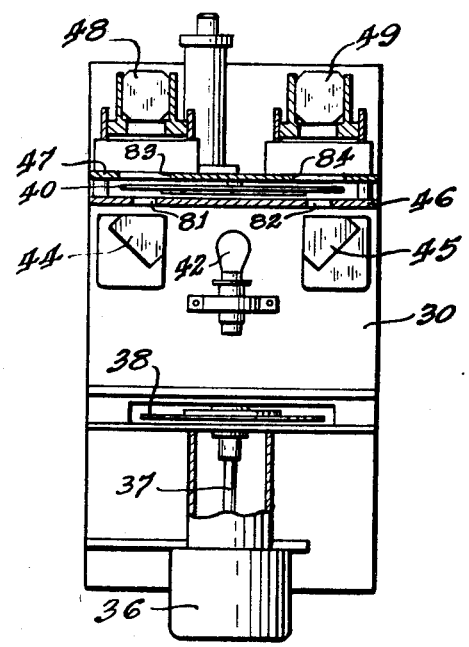
Fig-7
Fig-9
INVENTOR.
Leon Bess
BY
Attorney

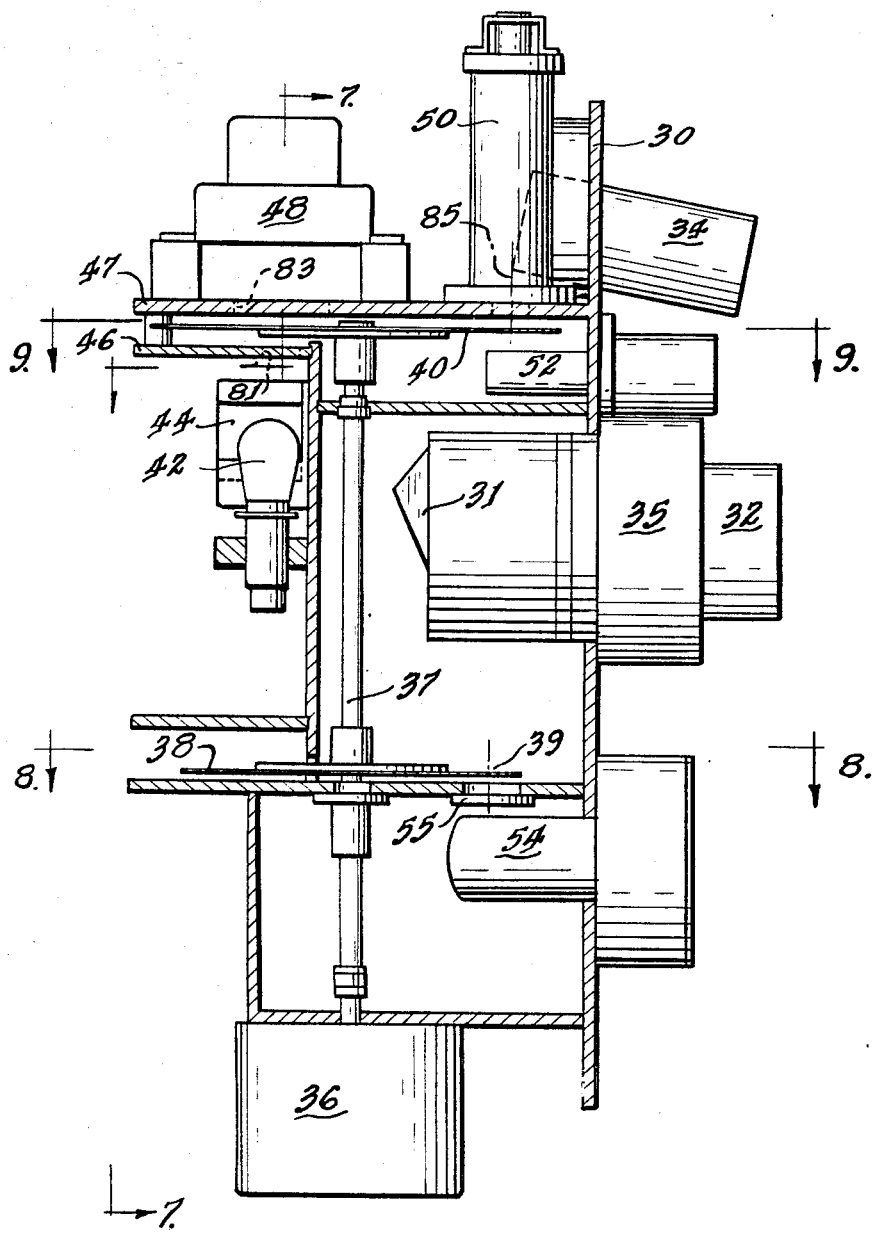

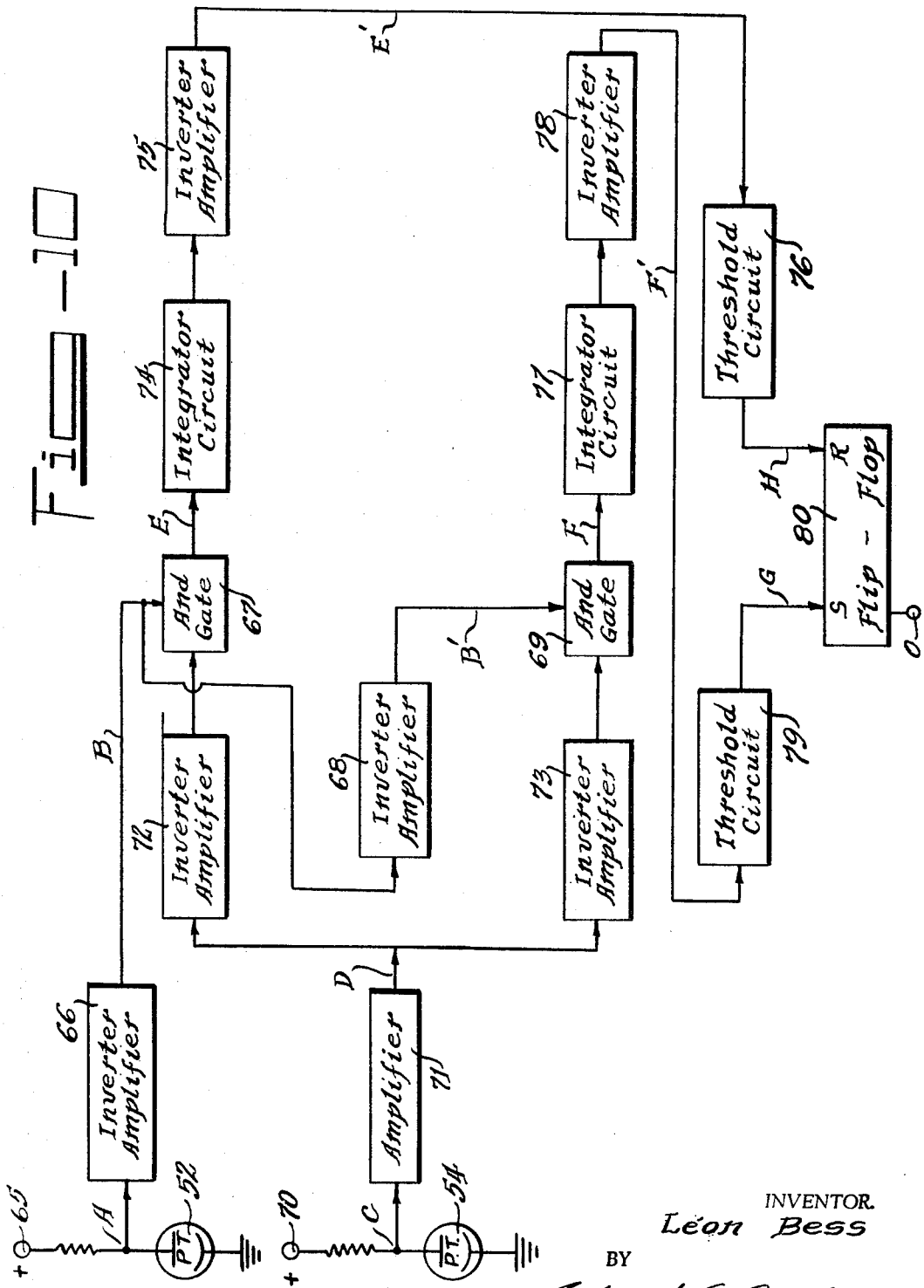

July 23, 1968  L. BESS  3,393,600
OPTICAL RANGING APPARATUS
Filed Sept. 10, 1965  6 Sheets-Sheet 6

INVENTOR.
Leon Bess
BY
Roland A. Anderson
Attorney

United States Patent Office 3,393,600
Patented July 23, 1968

3,393,600
OPTICAL RANGING APPARATUS
Leon Bess, Terre Haute, Ind., assignor to the United States of America as represented by the United States Atomic Energy Commission
Filed Sept. 10, 1965, Ser. No. 486,575
3 Claims. (Cl. 88—1)

This invention relates generally to optical range finders and more particularly to apparatus for determining the distance of an object from the apparatus employing the principle of triangulation.

The principle of triangulation as used in geometrical optics ranging is not new, but certain disadvantages are present in the existing methods employing this principle. The main disadvantage results from the fact that in an optical system the ratio of the size of the object to the size of the image depends upon the relative distances of object and image from the lens. This effect is commonly referred to as the magnification effect, and in a lens system having a fixed image distance, it produces an image size which is inversely proportional to the object distance.

In a range finder employing the triangulation principle, the magnification effect gives rise to respectively smaller increases in image size for equal incremental increases in object distance, the object size remaining unchanged. Since the triangulation method ultimately requires determination of image size as the analog of object distance, a scheme for measuring the image size must take into account the error introduced by the magnification effect. The present invention overcomes the nonlinearities caused by magnification and consequently greatly simplifies and increases the accuracy of the measurement of object distance.

One important object of the present invention is to provide novel, simple and very accurate means for determining the distance of an object by sensing and measuring a quantity which is a linear function of object distance.

Another object of the present invention is to provide means for generating an electrical signal representing the object distance.

It is yet another object of the present invention to provide optical ranging apparatus having an output electrical signal representative of object distance wherein there exists a unique signal for each object distance within the useful range of the apparatus.

Briefly, the above objects are accomplished as follows: a source of collimated light is oriented relative to the object whose distance is to be measured and the receiving lens such that the locus of the image of the light spot reflected from the object falls on a rotating disk located behind the receiving lens. The angular displacement of the image spot on the disk in response to the variable object distance is a linear function of the object distance. The angular displacement is then measured and converted to an electrical voltage signal which has a time duration proportional to the angular displacement and therefore representative of object distance.

The nature and objects of the present invention can be better understood from the following description accompanied by the attached drawings which illustrates, by way of example, a preferred embodiment of my invention.

FIG. 6 is a partially sectioned view taken on line 6—6 of FIG. 5.

FIG. 7 is a partially sectioned view taken on line 7—7 of FIG. 6.

FIG. 8 is a top view taken through the line 8—8 of FIG. 6.

FIG. 9 is a top view taken through the line 9—9 of FIG. 6.

FIG. 10 is a block diagram representing the electrical circuitry of a preferred embodiment of the present invention.

Figure 1:
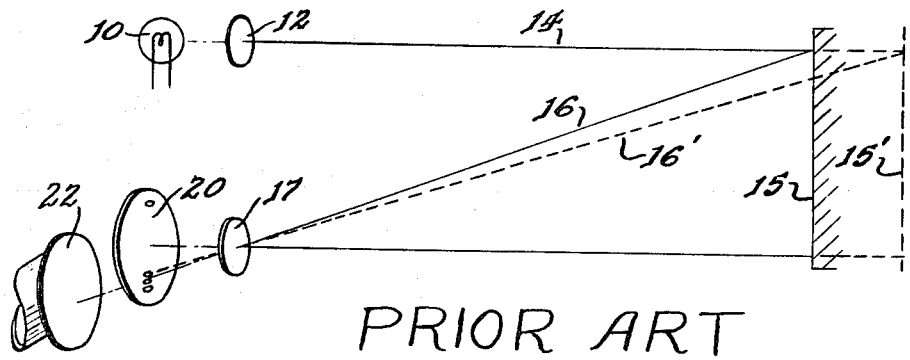
FIG. 1 illustrates schematically the principle of triangulation as known in the prior art.

Referring to FIG. 1, a source 10 emits light which is focused by a transmitting lens 12 into a parallel or collimated beam 14. A surface 15 of the object whose distance is to be measured reflects the light beam 16 into the receiving lens 17 which focuses the reflected light beam 16 onto a disk 20 located behind the lens 17. The disk 20 may have apertures placed along circles located concentrically about the disk 20. The apertures allow the passage of light through the disk 20 onto a photosensitive device 22. For each object distance the image spot is located at a related distance from the center of disk 20 and discrimination is made between the different object distances by having a different number of apertures placed on each circle of the disk 20. The disk 20 is then rotated and the number of light pulses reaching the photosensitive device 22 is counted. As the object surface 15 moves further away from the receiving lens 17 to 15', the focused light beam 16' falls closer to the center of the rotating disk 20 thus moving the image spot to a different radial distance along the disk 20 allowing more pulses of light to impinge upon the photosensitive device 22 per revolution of the disk 20. It can be seen that since the beam 14 is parallel to the focal axis of the lens 17, the object size remains constant and the distance of the image spot from the center of disk 20, which I call the image size, is inversely proportional to object distance. This type of optical ranging system is described in U.S. Patent No. 2,468,042, L. Cranberg, dated Apr. 26, 1949.

Figure 2:
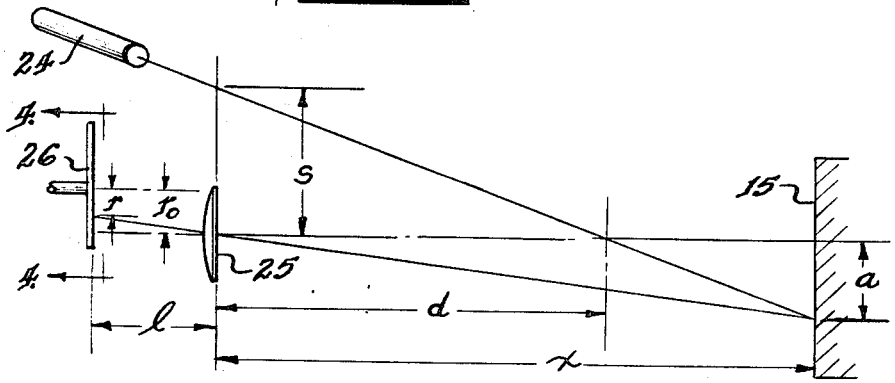
FIG. 2 is a side view of apparatus which illustrates diagrammatically the basic principle of the present invention.
Figure 3:
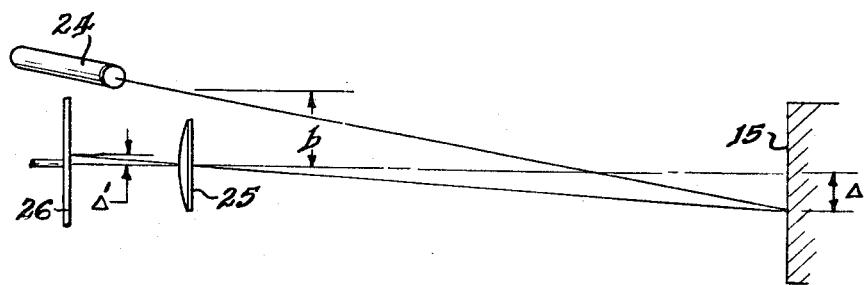
FIG. 3 is a top view of the apparatus shown in FIG. 2.

In FIGS. 2 and 3 which relate to the present invention, a source 24 of collimated light is directed toward a surface 15 of an object whose distance is to be measured. A lens 25 is adapted to receive the light reflected from the surface 15. The distance from the center of the lens 25 to the surface 15 measured along the axis of the lens 25 is designated as $x$. The lens 25 focuses the reflected light beam on a disk 26 which is fixed behind the lens 25 at a distance indicated by the distance $l$. The disk 26 rotates about an axis which is vertically displaced from the focal axis of the lens 25 by an amount $r_0$. The image spot is vertically displaced by a variable distance, indicated as $r$, from the axis of disk 26. The light beam from source 24 is directed to cross the plane of the lens 25 at a distance $s$ above the axis of the lens 25 and to intersect the axis of the lens 25 at a distance $d$ from the center of the lens 25. The light beam strikes the surface 15 at a location which is vertically displaced from the axis of lens 25 by a distance indicated by the letter $a$ (FIG. 2).

FIG. 3 shows a top view of the light source 24 directed toward the surface 15 of the object whose distance is to be measured and, again, focused on the disk 26. The light beam from source 24 crosses the plane of the lens 25 at a projected lateral distance $b$ from the axis of the lens 25.

In FIG. 3, $\Delta$ refers to the object size and is measured by the lateral displacement of the light spot on the surface 15 from the projection of the axis of the lens 25. The image size, designated as $\Delta'$, is the lateral displacement of the image light spot on the disk 26 measured from the axis of lens 25.

A most important feature of the present invention, sought to be illustrated here, is that object distance is determined by measuring the angular displacement of the image spot with respect to the disk 26. The means and reason for doing this will be made clear in subsequent discussion.

A relationship will now be derived between the parameters of FIGS. 2 and 3 which will indicate proper orientation of the light source 24 so that the angular displacement of the image spot on the rotating disk 26 will be linearly related to the object distance $x$. From FIG. 3, using similar triangles we see that:

$$\Delta/x = \Delta'/l \tag{1}$$

We can also see from FIG. 3, using similar triangles, that:

$$\frac{\Delta}{x-d} = \frac{b}{d} \tag{2}$$

Using similar triangles in FIG. 2 we see that:

$$\frac{r_0 - r}{l} = \frac{a}{x} \tag{3}$$

and we can also see that:

$$\frac{a}{x-d} = \frac{s}{d} \tag{4}$$

Solving for $a$ in Equation 4 and substituting the resulting expression into Equation 3 we find that:

$$r = r_0 - \frac{sl(x-d)}{xd} \tag{5}$$

Designating $\theta$ as the angular displacement of the image spot from a vertical line passing through the center of the disk 26, and assuming that the angular displacement will be relatively small so that the sine of $\theta$ will be equal to $\theta$, we can then see from FIGS. 2 and 3 that:

$$\sin \theta = \theta = -\Delta'/r \tag{6}$$

Eliminating $\Delta$ and solving for $\Delta'$ in Equations 1 and 2, and substituting the resulting expression for $\Delta'$ into Equation 6, and also substituting the expression for $r$ of Equation 5 into Equation 6, we find, after simplifying and regrouping the denominator, that:

$$\theta = \frac{lb(x-d)}{sld + x(r_0 d - sl)} \tag{7}$$

It can be seen from Equation 7 that the relationship between $\theta$ and $x$ can be made linear if the coefficient of $x$ in the denominator can be reduced to zero. This is accomplished by establishing the following parametric relationship:

$$r_0/l = s/d \tag{8}$$

With the relationship in Equation 8 established, Equation 7 reduces to:

$$\theta = \frac{b}{sd}(x-d)$$

which shows $\theta$ to be a linear function of the displacement of the object from the point at which the collimated light beam of source 24 is directed to cross the axis of the receiving lens 25. The angular displacement will be positive for $x$ greater than $d$ and negative for $x$ less than $d$. The relationship of Equation 8 indicates that there must be similarity between two triangles of FIG. 2. The first is formed on two sides by the lengths $s$ and $d$; and the second triangle is formed by the lengths $r_0$ and $l$. The lateral displacement of the light source 24 from the focal axis of lens 25, as indicated by the letter $b$ in FIG. 3, does not affect this linearity as long as Equation 8 is satisfied and the assumption leading to the derivation of Equation 6 holds true. In other words, $b$ must be selected such that for a predetermined useful range over which the apparatus is to operate within a given accuracy, the horizontal displacement of the image spot on the disk 26 will be small enough so that the sine of the angular displacement $\theta$ may be approximated by the angle $\theta$ itself.

Figure 4:
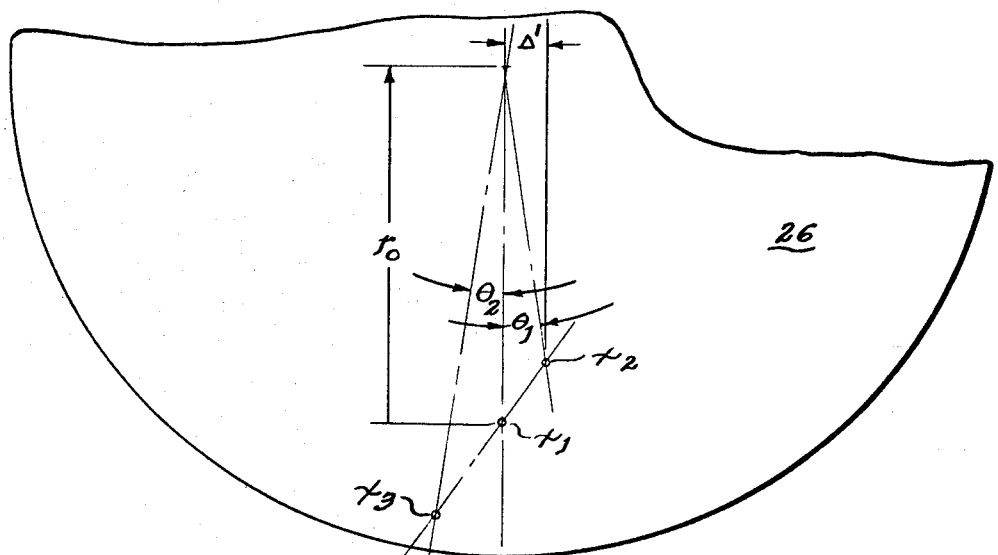
FIG. 4 is a fragmentary frontal view taken through the line 4—4 of FIG. 2.

FIG. 4 illustrates the locus of the image spot on the disk 26 for three different object distances with equal separation between successive object locations. Location of the image spot at $x_1$ on FIG. 4 shows the position of the image spot when the object is at a distance $d$ from the lens. Consequently, location $x_1$ falls on the spot marked by a projection of the focal axis of lens 25 through disk 26 as indicated by $r_0$ of FIG. 2. Location $x_2$ shows the position of the image spot on the disk 26 for an object located at a distance $d+y$ (where $y$ is an arbitrary distance) from the lens 25. Location $x_3$ shows the position of the image spot for an object located at a distance $d-y$ from the lens 25. The angular displacement of the image spot from the vertical radius marked by its location corresponding to the distance $d+y$ is shown as $\theta_1$. The angular displacement of the image spot from the vertical radius marked by its location corresponding to the distance $d-y$ is shown as $\theta_2$. For the parametric relationship set out in Equation 8 the magnitude of $\theta_1$ will be equal to the magnitude of $\theta_2$ in this example.

The locus of the image spot on the disk 26 is a straight line indicated by $x_3$–$x_2$. The magnification effect, as explained in the text accompanying FIG. 1, is still present with respect to the locus of the image spot since the distance between $x_3$ and $x_1$ along the image spot locus is greater than the distance from $x_1$ to $x_2$ along the same line even though they represent equal incremental increases in object distances. However, the measuring scheme herein described determines the angular displacement of the image spot on the disk 26 as the analog of object distance, rather than using the straight-line distance between successive locations of an image spot as described in the text accompanying FIG. 1.

The specific embodiment in which I have incorporated my invention, described below, will indicate how I measure the relative angular displacement of the image spot over an extended range of positive and negative angles by using two sources of collimated light, but it may be noted at this point that my invention has certain inherent advantages:

(1) The magnification effect, which introduces non-linearities in the image size as a function of object distance, is overcome.

(2) By establishing a linear analog of object distance, measurement accuracy is constant and greatly increased over the useful range of the apparatus.

(3) By measuring relative angular displacement, there is a continuity between readings. That is, the apparatus is not limited to output readings only for discrete values of object distance. There are unique analog measurements for a continuum of object distances.

Figure 5:
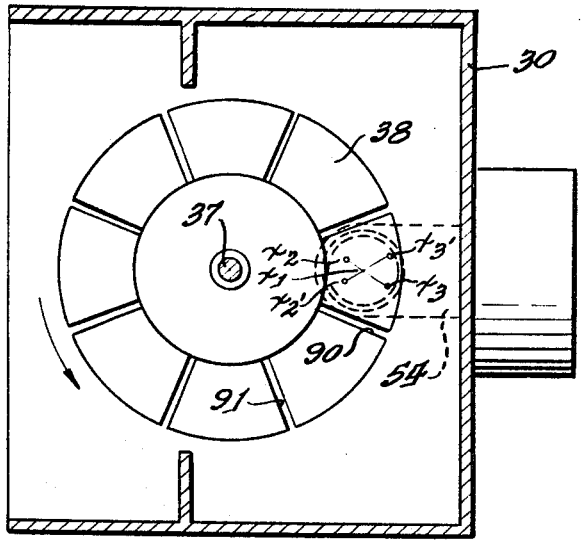
FIG. 5 is a frontal view of apparatus incorporating a preferred embodiment of the invention.

(4) By measuring angular displacement with a disk rotating at constant angular velocity, a time base is generated whereby ranging information may be converted directly to a time analog; for example, range may be indicated by time-duration of an electrical signal Referring now to FIGS. 5–7, a cabinet 30 houses the apparatus comprising a preferred embodiment of my invention. A lens 32 is centered in the front side of cabinet 30 with its focal axis extending perpendicularly into the the plane of the page (FIG. 5). Two crossbeam lenses 33 and 34 are attached to the cabinet 30 above the axis of lens 32 and symmetrically located on either side thereof so that the axes of the crossbeam lenses 33 and 34 intersect the focal axis of lens 32 at a common point in front of the plane of lens 32 (the distance $d$ of the previous discussion).

FIG. 6 shows the lens 32 attached to the cabinet 30 by means of a lens holder 35. The lens 32 is the counterpart of the receiving lens 25 of FIG. 2. Located directly behind lens 32 and adapted to receive light focused thereby is a pentaprism 31, the function of pentaprism 31 will be made clear in subsequent discussion.

A synchronous motor 36 drives a rotatable shaft 37 to which is fastened a first disk or wheel 38 and a second disk or wheel 40. The wheel 38 is called the sensor wheel and has eight narrow slits located along equally separated radii, as shown in detail in FIG. 8. The wheel 40, referred to herein as the shutter wheel, is divided into eight 45° sections, with the material of alternate sections removed to form four fins or shutters, as is shown in detail in FIG. 9.

A light source 42 is mounted below and toward the rear of the shutter wheel 40, and between two crossbeam divider prisms 44 and 45, as can be seen in FIG. 7. Above the crossbeam divider prisms 44 and 45 is a mounting plate 46 containing two holes indicated by reference numerals 81 and 82. The holes 81 and 82 are directly above the respective crossbeam prisms 44 and 45 and allow the passage of light emanating from source 42 as reflected by the crossbeam prisms 44 and 45 into vertical paths. The shutter wheel 40 is located above the mounting plate 46 and adapted so that when any of the fins of the wheel 40 is directly over either hole 81 or 82, the passage of light will be prohibited (FIG. 9). A second mounting plate 47 is fixed above the shutter wheel 40 and has holes (indicated by reference numerals 83 and 84) located above the holes 81 and 82 in mounting plate 46 respectively. A prism 48 is adapted to receive light passing through the hole 83 of plate 47 and to reflect this light at a 90° angle into crossbeam lens 34. A prism 49 is adapted to receive light passing through hole 84 of plate 47 and to reflect this light at a 90° angle into crossbeam lens 33. Thus each crossbeam lens 33 and 34 acts as a projector of a collimated beam of light toward the object whose distance is to be measured. One reason for using two projectors of collimated light, as will be explained in more detail below, is that it obviates the need for distinguishing between positive and negative angular displacements of the reflected image spots on the sensor wheel 38.

A time lamp and lens assembly 50 is mounted above an opening on plate 47 with the axis of its lens perpendicular to the plane of the shutter wheel 40 as indicated by reference numeral 85. A phototube 52 is mounted below the shutter wheel 40 and adapted to receive the light from the timer lamp and lens assembly 50 when not blanked by any of the fins or shutter wheel 40. Mounted below the receiving pentaprism 31 (FIG. 6) and on the opposite side of the sensor wheel 38 is a sensor phototube 54. A monitor lens 55 is located between the sensor wheel 38 and the sensor phototube 54.

FIG. 9 illustrates the relative locations of the following: the holes 81 and 82 in mounting plate 46; the axis 85 of the lens of timer assembly 50; and the center of shaft 37 which also is the center of rotation of the shutter wheel 40. The angular separation between the center of the hole 81 and the center of the hole 82 with respect to the center of rotation of the shutter wheel 40 is 135°. The angular separation between the center of the hole 81 and he axis 85 of the lens of timer assembly 50 is 90°. It can be seen that when the shutter wheel 40 is rotating at a constant velocity, the two light beams from the source 42 pass through the plane of the rotating shutter wheel 40 periodically and at mutually exclusive and equal times (except for the relatively short time when the edges of the fins of the shutter wheel 40 are passing directly over the holes 81 and 82). It can be further seen that the establishment of the light path between timer lamp and lens assembly 50 and its associated phototube 52 is in phase with the passage of light through the plane of shutter wheel 40 as reflected by divider prism 44 through the hole 81.

Referring to FIGS. 6 and 7, we will now trace the path of light transmitted through the apparatus to the object whose distance is to be measured, its reflection from the surface (not shown) of the object, back through the receiving lens and into the electrical signal processing circuitry of the apparatus. The light source 42 is energized by a constant voltage (not shown). Light from the filament of source 42 is received by triangular prisms 44 and 45 and reflected at a 90° angle into vertical paths. The two light beams emanating from the prisms 44 and 45 are perpendicular to the plane of the shutter wheel 40 and pass through the mounting plate 46 at holes 81 and 82 respectively crossing the plane of the shutter wheel 40 at an angular separation of approximately 135° from each other when measured with respect to the axis of rotation of the shutter wheel 40. When the shutter wheel 40 is rotating at constant angular velocity, the light from the prisms 44 and 45 is chopped or blanked so that the light passing through the plane of the shutter wheel 40 takes the form of the two parallel, pulsed beams of light occurring periodically at mutually exclusive and equal time intervals, as explained above. These light beams then pass through mounting plate 47 at the holes 83 and 84 respectively and are reflected at another 90° angle by the prisms 48 and 49 respectively and directed toward the crossbeam lenses 34 and 33 respectively.

The light reflected from the surface of the object (not shown) whose distance is to be measured is focused by the receiving lens 32 and reflected at a 90° angle by the pentaprism 31. The reason for using a pentaprism rather than a triangular prism to reflect the received light will be made clear by referring to FIGS. 2 and 3. In the text accompanying those two figures, in which the basic principle of the invention was explained, it was implied that as the object distance increases, the locus of the image spot must be generally in a direction so as to bring it closer to the center of the disk 26 which is located behind the receiving lens 25. This is due to the fact that for equal incremental increases in object distance, the image spot will move in a straight line but at successively smaller corresponding intervals, and it is necessary that the locus of the image spots subtend equal angular displacements with respect to the disk 26 for equal incremental increases in object distance. With reference to FIG. 6, this requirement means that as the object distance increases, the beam spot on the object surface (not shown) will be lowered relative to the axis of the lens 32 and the image spot on the sensor wheel 38 must be made to move generally closer to the shaft 37 of the sensor wheel 38. The pentaprism 31 placed behind the lens 32 accomplishes this purpose by providing for two internal reflections which eliminate the effect of mirror reflection which would be present if only one reflection were allowed. It will be noted by these skilled in the art that any prism would be suitable for this purpose so long as it provides for an even number of internal reflections.

The function of the pentaprism 31 as employed in my preferred embodiment is well known to those skilled in the art, as are other optical reflection and focusing techniques which may be used to direct the focused beam into a path approximately perpendicular to the plane of the sensor wheel 38 with the proper orientation of image spots. The similarity of triangles, as explained in the example illustrating the basic principle of the invention, is achieved by computing the distance $l$ (FIG. 2) as the optical projection of the axis of the receiving lens 32 from the center of the receiving lens 32 through the various reflections within the pentaprism 31 to the plane of the sensor wheel 38. The length $\Delta$ is represented by the distance between the beam spots as they appear on the object, and the distance $\Delta'$ is represented by the distance between the image spots on the sensor wheel 38. It will be noted that, for convenience, the plane of the sensor wheel 38 is perpendicular to the plane of the receiving lens 32, but that the center of the sensor wheel 38 is still in a vertical plane containing the axis of the lens 32. The distance $r_0$ (FIG. 2) is then measured from the optical projection of the focal axis of lens 32 on the sensor wheel 38 to the center or axis of rotation of the sensor wheel 38. Any such reflections or even a rotation of the receiving light system are well within the skill of the art.

The resulting light beam emanating from the pentaprism 31 is directed toward the sensor wheel 38 at the spot marked by the reference numeral 39 in FIG. 6. Light passing through the slits of the sensor wheel 38 is then focused by the monitor lens 55 onto the sensor phototube 54 and converted to an electrical signal.

It will now be helpful to establish the various light paths in relation to the movement of the shutter wheel 40 and the sensor wheel 38. With reference to FIG. 9, the rotation of the fins of the shutter wheel 40 may be taken as our time reference since they determine when light is being projected toward an object. There are four symmetrical 90° sections into which both the shutter wheel 40 and the sensor wheel 38 may be divided, and these provide for the taking of four separate measurements of object distance for each complete rotation of the shaft 37. For purposes of this discussion we consider only one of the sections; that is, a 90° sector of each wheel. The discussion will then apply equally to each of the remaining sectors. The shutter wheel 40 rotates in a counter clockwise direction (FIG. 9) and is the time base upon which the light paths are established. It will be helpful to think of the establishment and interruption of light circuits between source 42 and sensor phototube 54, similar to the making and breaking of electrical circuits. We will briefly retrace the establishment of one light circuit (the one through crossbeam lens 33) with the realization that a similar and symmetrical light circuit may be established through the other crossbeam lens 34 in a subsequent time period. As explained above, it is impossible for the two light circuits to be established simultaneously due to the relation of the fins of shutter wheel 40 and holes 81 and 82. The light emanating from source 42 is reflected by the divider prism 45 and the crossbeam prism 49 into lens 33 and directed toward the object (not shown) whose distance is to be measured; the reflection from the object impinges on the receiving lens 32 and is reflected by the pentaprism 31 through a slit on the sensor wheel 38 into the monitor lens 55 and terminates finally on the sensor phototube 54. This light circuit may be thought of as established when the shutter wheel 40 is in a position allowing passage of light from divider prism 45 to crossbeam prism 49, and the sensor wheel 38 is in a position such that a slit is located directly below the image spot allowing light to impinge on the sensor phototube 54.

The sensor wheel 38 is phased relative to the shutter wheel 40 such that the slits of the sensor wheel 38 are located in a vertical plane with the edges of the fins of the shutter wheel 40 (FIG. 9). FIG. 8 shows the locus of image spots on the sensor wheel 38 for three different object distances as described in connection with FIG. 4. The location $x_1$ represents the optical projection of the focal axis of lens 32 as reflected by pentaprism 31. The line $x_3-x_2$ represets the locus of image spots generated by the light path taken through crossbeam lens 34 for increasingly further object locations. The line $x_3'-x_2'$ represents the locus of image spots for the same three object distances but generated by the light path taken through crossbeam lens 33.

Assuming that the shutter wheel 40 is in a position allowing the light path taken through lens 33 to be established, as is shown in FIG. 9, a light circuit will be completed only when the corresponding slit, which in this example would be the one indicated by numeral 90 in FIG. 8, sweeps through the location of its respective image spot which will be located along the line $x_3'-x_2'$. This marks the beginning of the measurement of angular displacement of the sensor wheel 38. As shutter wheel 40 rotates approximately another 45°, the light path taken through lens 34 will be established when the slit 91 passes beneath its corresponding image spot occurring along the line $x_3-x_2$. This marks the end of the measurement of angular displacement of the sensor wheel 38. It is thus noted that alternate slits of the sensor wheel 38 are uniquely identified with the light path through a particular cross-beam lens to allow establishment of a light circuit. This is an important feature of the invention because it obviates the need to distinguish between positive and negative angular displacement of the image spots, as was required in the example illustrating the basic principle of the invention wherein only one light source was used. A few examples will make this feature clear. If $d$ represents the distance at which the collimated light beams cross the axis of the receiving lens 32 measured from the plane thereof, and $y$ is some arbitrary distance, then for an object distance of $d$, both image spots fall at the location $x_1$ on the sensor wheel 38 and the angular displacement of the sensor wheel will be measured between the time that slit 90 crosses the location $x_1$ and slit 91 crosses the same location, that is, the time required for a 45° rotation of the sensor wheel 38. For an object distance of $d-y$, the angular displacement of the sensor wheel 38 will be measured between the time slit 90 crosses the location $x_3'$ and the slit 91 crosses the location $x_3$, which will measure less time than for a 45° rotation of sensor wheel 38. For an object distance of $d+y$, the angular displacement of the sensor wheel will be measured between the time slit 90 crosses the location $x_2'$ and the slit 91 crosses the location $x_2$, which will measure greater than the time required for a 45° rotation of sensor wheel 38. Thus the time measured for the sensor wheel 38 to rotate through a given angular displacement of the image spots relative to the sensor wheel 38 provides a direct and linear measure of the distance of an object from the center of the lens 32.

The reason that the slits of sensor wheel 38 form a vertical or nearly vertical alignment with the fins of shutter wheel 40 is so that a slit will be moving through the area of the image spots beneath pentaprism 31 at the same time that the light passing through one of the holes 81 or 82 is centered between the edges of adjacent fins of shutter wheel 40. This assures establishment of only one light path during the time when a slit of sensor wheel 38 is passing beneath an image spot.

The discussion which follows will explain how an electrical signal representing object distance is derived from the pulsed signal generated at the sensor phototube 54 and the time base or clock signal generated at the clock phototube 52.

FIG. 10 is a diagrammatic representation of the basic circuits used in a preferred embodiment of the present invention. The circuits are generally represented in block diagram form because the actual circuit elements may take a variety of forms, all of which are well known to those skilled in the art. Referring then to FIG. 10, a phototube 52 is biased by a positive voltage (not shown) at 65 such that the conductivity of the tube 52 will be greatly increased when light impinges upon the photocathode of the tube 52. An inverter amplifier 66 is connected to the anode of the phototube 52. The output of inverter amplifier 66 acts as the gating input to drive an AND gate 67, an inverter amplifier 68 is also connected to the output of inverter amplifier 66 and is connected to the input of another AND gate 69. Thus the AND gates 67 and 69 are enabled by opposite phases of the clock signal.

A second phototube 54 is biased positively at 70 and connected to the input of an amplifier 71. The inputs of an inverter amplifier 72 and an inverter amplifier 73 are connected in common with the output of the amplifier 71. The output of the inverter amplifier 72 is connected to the signal input of the AND gate 67 and the output of inverter amplifier 73 is connected to the signal input of the AND gate 69. Connected in series with the output of the AND gate 67 are an integrator circuit 74, an inverter amplifier 75 and a threshold circuit 76. Connected to the output of AND gate 69 are an integrator circuit 77, an inverter amplifier 78 and a threshold circuit 79. The outputs of the threshold circuit 79 and the threshold circuit 76 are connected respectively to the "set" and "reset" input terminals of a flip-flop 80. The output signal of flip-flop 80 is the desired output signal representing object distance.

Figure 11:
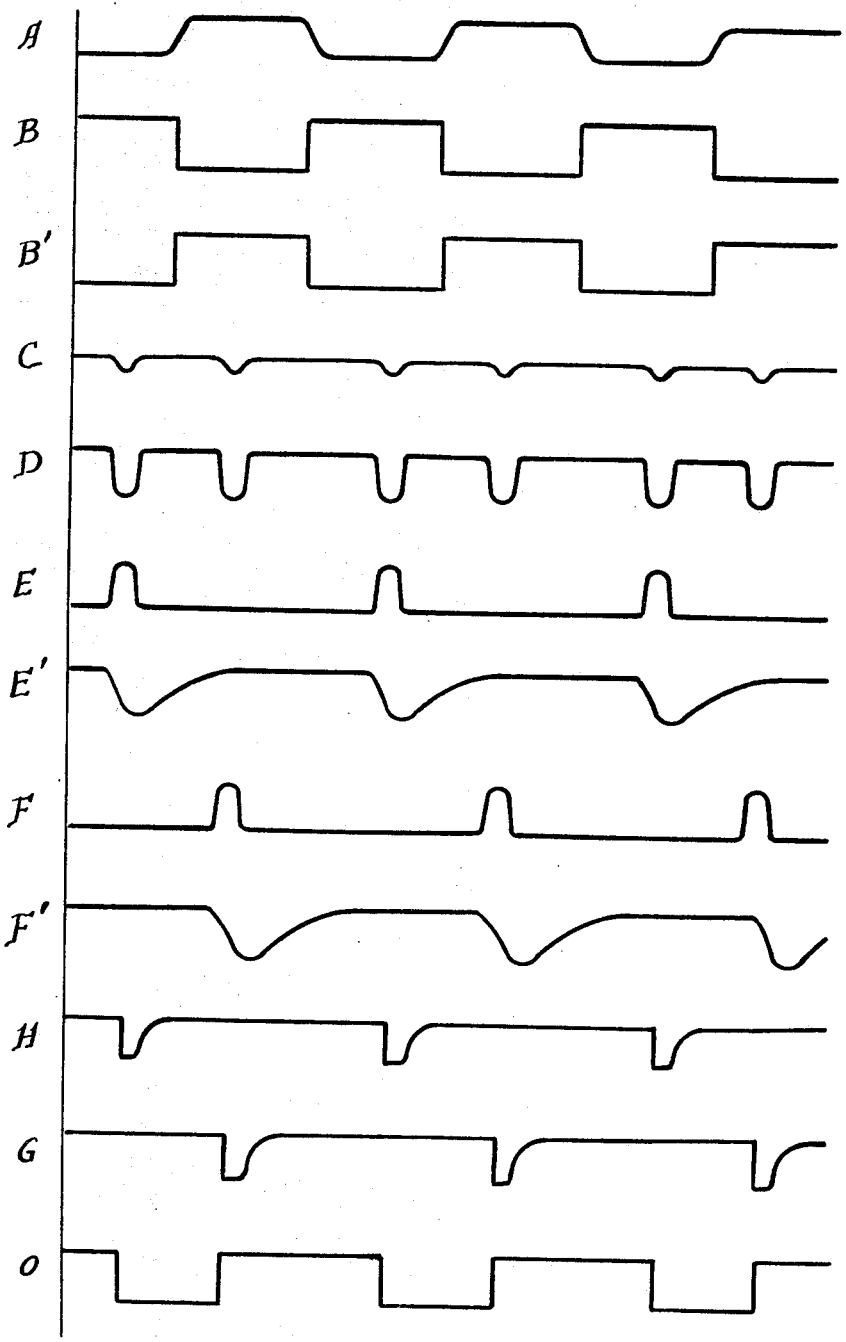
FIG. 11 is an electrical signal timing diagram for the circuitry of FIG. 10.

The sequencing operation of the circuitry of FIG. 10 can best be illustrated by a timing diagram as shown in FIG. 11 which shows the relative timing and signal processing sequence taken to derive the output signal. Assuming that the rotation of the shaft 37 of FIG. 6 is counter clockwise, FIG. 9 shows the relative location of the axis of the light beam from the timer lamp assembly 50 on the shutter wheel 40 by reference numeral 85. The incident light on the clock phototube 52 is in phase with the pulsating beam of light taken through lens 34. In other words, the phototube 52 is in a conducting state during the same time that a light path is established between divider prism 44 and crossbeam prism 48. As mentioned above, I have taken the signal generated at the clock phototube 52 as the time base or clock of the signal processing by the circuitry of the FIG. 10. Consequently, the output signal of phototube 52 of FIG. 10 is represented by the voltage waveform at A in FIG. 11 in which time is the abscissa. The output of the inverter amplifier 66 which amplifies and clips the output of phototube 52 is represented at B of FIG. 11. This is the voltage used to enable AND gate 67. The inversion caused by inverter amplifier 68 is shown at B' of FIG. 11, and it is used to enable AND gate 69. The phototube 54 receives incoming light focused by lens 32 of FIG. 6 and reflected by pentaprism 31 as it passes through a slit of sensor wheel 38 and monitor lens 55. Even though a light beam may be incident upon sensor wheel 38, this light will not cause the phototube 54 to conduct until such time as one of the slits of sensor wheel 38 is rotated beneath the location of the image spot on sensor wheel 38 so that the light can pass through. The output voltage of the phototube 54 is then amplified by the amplifier 71, which is a linear amplifier. The output voltages of phototube 54 and amplifier 71 are shown respectively at C and D of FIG. 11 as negative-going, bell-shaped pulses. It is noted at this point that the phototube 54 does not distinguish as to which particular crossbeam leans is transmitting the light causing it to conduct. The clock phototube 52 and its associated circuitry act as a memory to indicate which light path is causing conduction of the sensor phototube 54. This is necessary in order to determine which pulse marks the beginning and which marks the end of the time measurement.

The output of amplifier 71 is connected to inverter amplifiers 72 and 73. The inversion is required because the output pulses from amplifier 71 are negative-going, and the AND gates 67 and 69 operate on positive-going input pulses. The output of the AND gate 67 is shown at E of FIG. 11. The AND gate 67 gives a positive output voltage only when both the output of inverter amplifier 66 and the output of the inverter amplifier 72 are positive voltages. The output of AND gate 69 is shown at F of FIG. 11, and it is positive only when the output of inverter amplifier 68 and the output of inverter amplifier 73 are positive voltages. It is the positive pulse outputs of AND gates 69 and 67 which mark the beginning and the end respectively of the measurement of angular displacement of the sensor wheel 38. This is accomplished by alternately gating pulses generated at the sensor phototube 54 through the AND gates 69 and 67, and then measuring the time difference between the output pulses. The output of AND gate 67 is integrated by integrating circuit 74 and inverted by inverter amplifier 75. The output of the inverter amplifier 75 is represented at E' of FIG. 11 as a negative-going voltage. A similar output of inverter amplifier 78 is represented at F'. The threshold circuits 76 and 79 give fast-rise-time negative output pulses whenever their input voltages fall below a predetermined threshold level. These thresholds are designed to give an output whenever the AND gates 67 and 69 pass the timing voltage pulses. Flip-flop 80 is designed to be set and reset on the negative-going edges of input pulses. The output of threshold circuit 79 is used to set the flip-flop 80 on the first phase of the time base, that is when the crossbeam lens 33 is transmitting light toward the object and slit 90 moves under the image spot allowing light to impinge on phototube 54. The threshold circuit 76 resets the flip-flop 80 when the crossbeam lens 34 is transmitting light toward the object and slit 91 moves under the image spot. The resulting output voltage of flip-flop 80 is shown at 0 of FIG. 11. This voltage represents the measurement of object distance. That is, the time during which flip-flop 80 is positive is a linear measure of the object distance.

The use of two symmetrical light beams for determining an object distance has the advantage that in measuring the angular displacement between two image spots, a more accurate measurement may be made because the useful sector of the disk over which $\sin \theta$ equals $\theta$ is doubled.

A device which is an obvious equivalent to the one discussed above, and one which would operate in the same manner, has one of the transmitting lenses mounted directly above the axis of the receiving lens. The image spot thereby generated would travel in a locus which lies on the radius of sensor wheel 38 located in the vertical plane containing the axis of receiving lens 32. This image spot would start the measuring process at the same relative location of sensor wheel 38 at all times, and the other image spot, whose angular displacement on the disk is still a linear function of object distance, would complete the measuring process. Consequently, it is to be understood that I do not intend that my invention be limited to the preferred embodiment described above in detail or the equivalent discussed, but I intend to cover all modifications and alternative constructions falling within the spirit and scope of the invention as expressed in the appended claims.

The embodiments of the invention in which an exclusive property or privilege is claimed are defined as follows:

1. Optical ranging apparatus comprising:
    (1) a source of light;
    (2) means having an axis extending in the direction of ranging for receiving and focusing light reflected from an object whose distance is to be measured;
    (3) means for forming light from said source into a collimated light beam and for projecting said beam toward said object, the axis of said collimated beam intersecting the axis of said focusing means at a distance, $d$, from the plane of said focusing means, the axis of said collimated beam also intersecting the plane of said focusing means at a vertical displacement, $s$, from the axis of said focusing means;
    (4) rotatable means for intersecting the focused light reflected from said object, whereby an image spot is formed on said rotatable means by the reflection of said collimated beam, said rotatable means being mounted at a distance, $l$, from said focusing means measured along the optical projection of the axis of said focusing means and perpendicular to said optical projection, the axis of rotation of said rotating means being displaced by a distance, $r_0 = sl/d$, from the optical projection of the axis of said focusing means such that the angular displacement of said image spot on said rotatable means is a linear function of the distance of said object from the plane of said focusing means; and
    (5) means for periodically measuring said angular displacement in timed relation to said rotatable means and for generating an electrical signal representative thereof.

2. Optical ranging apparatus comprising:
(1) a source of light;
(2) means for forming light from said source into first and second collimated light beams and for projecting said light beams alternately toward an object whose distance is to be measured;
(3) lens means having an axis fixed in the direction of said object for receiving and focusing light reflected by the object, the axes of said projected beams of light symmetrically crossing the plane of said lens at locations on either side of the axis of said lens and vertically displaced by a distance, $s$, from the axis of said lens, and being directed to intersect said axis at a common point located at a distance, $d$, from the center of said lens;
(4) a disk rotatably mounted behind said lens at a distance, $l$, measured along the optical projection of the axis of said lens and positioned to intercept the focused light beams, whereby two image spots are formed on said disk and the angular separation of said image spots is linearly related to the object distance, the axis of rotation of said disk being located at a distance, $r_0$, from the optical projection of the axis of said lens and in a direction such that the locus of said image spots is symmetrical with respect to the axis of rotation of said disk and generally closer to said axis for further object distances, where $r_0 = sl/d$; and
(5) sensing means for periodically measuring the angular separation of said image spots on said disk in timed relation thereto.

3. Optical ranging apparatus comprising:
(1) a source of light;
(2) means for forming light from said source into first and second collimated beams and for projecting said beams in periodic alternately phased pulses toward an object whose distance is to be measured;
(3) first circuit means for generating a periodic electrical clock signal synchronized in time with said pulsed light beams;
(4) lens means having an axis fixed in the direction of said object for receiving and focusing said light beams after reflection from said object, the axes of said projected light beams symmetrically crossing the plane of said lens at locations on either side of the axis of said lens and vertically displaced by a distance, $s$, from the axis of said lens, said beams being directed to intersect said axis at a common point located at a distance, $d$, measured along the axis from the center of said lens;
(5) a disk having radially disposed apertures and rotatably mounted to perpendicularly intercept the optical projection of the axis of said lens at a distance, $l$, from the center of said lens measured along the optical projection of the axis of said lens, the axis of rotation of said disk being displaced by a distance, $r_0 = sl/d$, from the optical projection of the axis of said lens and at right angles therewith whereby an image spot is formed on said disk by each of said light beams during the time of projection, and the angular separation of said image spots is linearly related to the object distance, said apertures being disposed such that one aperture will be rotated through the area in which the image spots are located during each phase of the projection of light beams; and
(6) means including photosensitive means located behind said disk for generating electrical pulses in timed relation to the rotating disk as light passes through said apertures;
(7) second circuit means connected to said first circuit means and said pulse generating means responsive to said clock pulse signal for activating an output signal when one of said electrical pulses is generated and for deactivating said output signal when the subsequent electrical pulse is generated whereby the time duration of said output signal is a linear measure of the distance of said object from the center of said lens.

No references cited.

JEWELL H. PEDERSEN, *Primary Examiner.*

F. L. EVANS, *Assistant Examiner.*